(12) United States Patent
Blowers (10) Patent No.: US 8,249,963 B1
(45) Date of Patent: Aug. 21, 2012

(54) METHOD FOR PROVIDING COMPREHENSIVE ACH VENDOR SERVICES

(76) Inventor: Alden J. Blowers, Incline Village, NV (US)

( * ) Notice: Subject to any disclaimer, the term of this patent is extended or adjusted under 35 U.S.C. 154(b) by 1341 days.

(21) Appl. No.: 10/678,326

(22) Filed: Oct. 3, 2003

(51) Int. Cl.
*G06Q 40/00* (2006.01)
(52) U.S. Cl. .......................... 705/35; 705/39
(58) Field of Classification Search ............ 705/30, 705/36 R, 35, 39
See application file for complete search history.

(56) References Cited

U.S. PATENT DOCUMENTS

| | | | | |
|---|---|---|---|---|
| 5,117,356 | A * | 5/1992 | Marks | 705/30 |
| 5,987,433 | A * | 11/1999 | Crapo | 705/36 R |
| 6,401,079 | B1 * | 6/2002 | Kahn et al. | 705/30 |
| 6,411,938 | B1 * | 6/2002 | Gates et al. | 705/30 |
| 6,606,606 | B2 * | 8/2003 | Starr | 705/36 R |
| 7,039,898 | B2 | 5/2006 | Shah | |
| 7,089,200 | B2 | 8/2006 | Bode | |
| 7,305,347 | B1 | 12/2007 | Joao | |
| 2002/0184148 | A1 * | 12/2002 | Kahn et al. | 705/40 |
| 2003/0225638 | A1 | 12/2003 | Secola | |
| 2004/0010776 | A1 | 1/2004 | Shah | |
| 2004/0111361 | A1 * | 6/2004 | Griffiths et al. | 705/39 |
| 2004/0148215 | A1 | 7/2004 | Visconti et al. | |
| 2005/0010501 | A1 | 1/2005 | Ward | |
| 2006/0021799 | A1 * | 2/2006 | Hall et al. | 175/320 |

OTHER PUBLICATIONS

Alexander, Marcus and David Young. "Strategic outsourcing." Long Range Planning 29.1 Feb. 1996: 116-119.*
Non Final Office Action for U.S. Appl. No. 11/780,633, mailed Sep. 23, 2008.
Non Final Office Action for U.S. Patent No. 5117356, mailed Dec. 24, 2008.
Final Office Action for U.S. Appl. No. 11/054,993, mailed Jan. 23, 2009, 8 pages.
Non Final Office Action for U.S. Appl. No. 11/780,633, mailed Sep. 23, 2008, 18 pages.
Non final Office Action for U.S. Appl. No. 10/678,326 dated May 12, 2010.
Final Office Action for U.S. Appl. No. 11/780,633 dated Apr. 21, 2009.
Non final Office Action for U.S. Appl. No. 11/780,633 dated Sep. 23, 2009.
Final Office Action for U.S. Appl. No. 11/780,633 dated Apr. 19, 2010.
Non final Office Action for U.S. Appl. No. 11/763,348 dated Jul. 7, 2009.
Final Office Action for U.S. Appl. No. 11/763,348 dated Dec. 30, 2009.

* cited by examiner

*Primary Examiner* — Lindsay M. Maguire
(74) *Attorney, Agent, or Firm* — Blakely, Sokoloff, Taylor & Zafman (57) ABSTRACT

A method for providing a set of automated financial services to a set of clients. The set of automated financial services including payroll processing, trust fund management, investment of funds and ACH transactions processing. The system reduces financial risk for an administration by providing incoming transactions verification and risk management.

1 Claim, 7 Drawing Sheets

METHOD FOR PROVIDING COMPREHENSIVE ACH VENDOR SERVICES

BACKGROUND

1. Field of the Invention

The invention relates to automated financial services. Specifically, the invention relates to automated payroll vendor services for processing automated clearinghouse (ACH) transactions and handling payroll transactions and funds.

2. Background

Automated payroll services systems are provided to end users (e.g., businesses and similar organizations) via a vendor (e.g., a business that sells automated payroll services). The end user and/or vendor of automated payroll service systems must interact with and use multiple service providers in order to carry out financial transactions related to payroll processing including tax payment processing, trust fund processing, investment of funds, and similar financial transactions. The vendor and/or end users must additionally bear the liability for ACH transactions for their clients which incur non-sufficient funds (NSF) returns.

The need to interact with multiple "outside" service providers to carry out payroll management places a burden on vendors and/or end users of payroll service systems to produce the varied financial data required by these "outide" financial service providers. Each service provider (i.e., trust fund management provider, tax payment processor and similar service providers) has independent systems to implement its services. These independent systems each require a set of relevant financial data from the end user or vendor. This results in a duplicity of effort because end users and vendors must prepare the required data for each provider. This data varies but includes overlapping content between the service providers. This results in inefficiency with the end user and/or vendors and causes corporate control concerns for the end user and/or vendors by complicating the handling of payroll processing and similar financial transactions.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
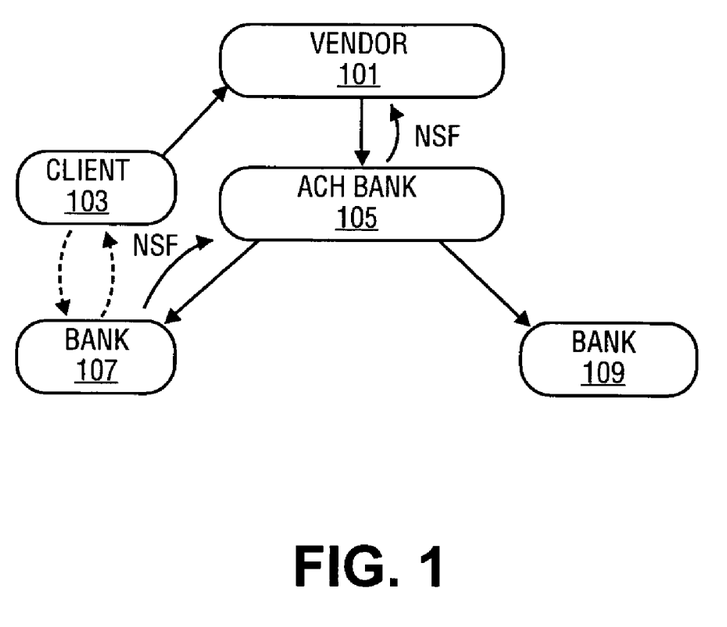
FIG. 1 is a diagram of the interrelationship of parties in an ACH transaction

FIG. 1 illustrates the relationship between a client 103, a vendor 101, an originating depository financial institution (ODFI) 105 and recipient depository financial institutions (RDFI) 107; the client's bank 107 and other banks 109. A client 103 may be a business or organization. The client 103 has a bank account at RDFI 107. A vendor 101 may be a business offering financial services such as payroll processing or similar services. ODFI 105 is any entity that will process ACH transactions. RDFI 107 and 109 are recipient banks, the beneficiary of an ACH transaction requested by client 103 and processed by vendor 101 and ODFI 105, the RDFI 109 may be the bank of an employee of client 103 or similar recipient having a bank account at RDFI 109.

Client 103 transmits transaction data to vendor 101 such as payroll data or similar financial transactions. Vendor 101 processes the data into a set of ACH transactions. Vendor 101 transmits the ACH transactions to ODFI 105. ACH bank 105 processes each ACH transaction and tracks the transactions. The ACH transactions, if successful, electronically transfer funds from the client's account at bank 107 to recipient's account at recipient's bank 109. If the client does not have sufficient funds with bank 107 a non-sufficient funds (NSF) notice will be returned to ODFI 105 and vendor 101. However, the ODFI 105 will deposit the intended amount in recipient's bank account, because each ACH transaction is processed separately and independently. Thus, vendor 101 must cover the NSF and attempt to collect this amount from client 103.

Figure 2:
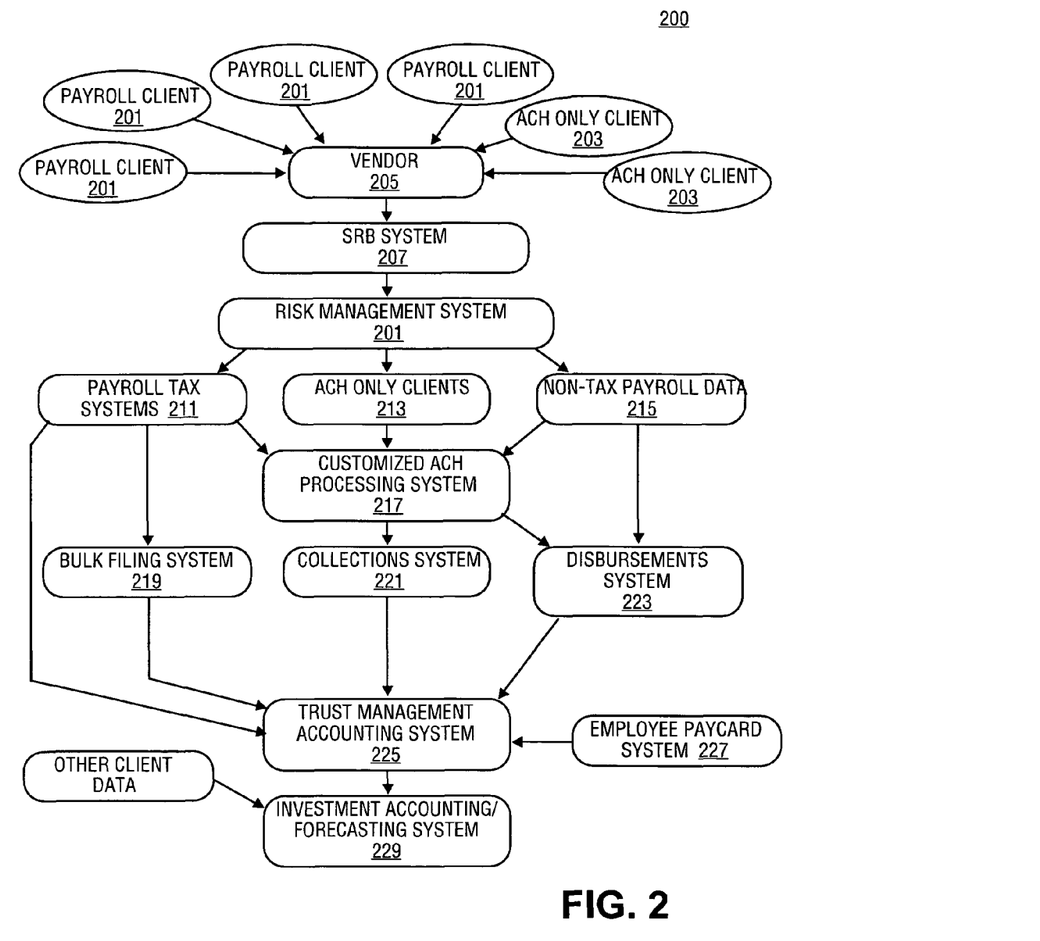
FIG. 2 is a flowchart of an automated system of managing financial transactions.

FIG. 2 is a flowchart of an automated financial transaction system 200. In one embodiment, vendor 205 provides a set of financial services (e.g, payroll services, ACH processing) to each client 201, 203. In one embodiment, client 201 uses vendor's payroll processing services. In another embodiment, client 203 may process its own payroll but use vendor's 205 ACH transaction services. In one embodiment, client 201, 203 does not use a vendor 205. Instead client 201, 203 interacts directly with an automated system 200 provider.

Vendor 205 receives financial transaction files from a set of clients 201, 203. The clients include payroll clients 201, ACH only clients 203 and similar client financial transaction types and sources. Vendor 205 compiles or receives incoming payroll data, ACH transaction requests and similar financial transactions in a set of transaction files. The vendor 205 receives incoming payroll data including organization information in a client master file (CMF). A CMF may include health benefits plan information, pay rates, employee status information and similar organization wide data. In one embodiment, CMF and transaction data are submitted to vendor 205 in a single periodic batch file from each client 201, 203. For example, client 201 may submit a file including transaction data and CMF data every two weeks, or similar period of time. A file may include multiple batches. A batch is a set of related data such as a payroll batch, tax batch, or similar set of data. For example, a file may include multiple payroll and tax batches.

In one embodiment, vendor 205 transmits the transaction file with CMF data via a network, a dial up connection, or similar electronic method to a server of automated system 200 provider. In one embodiment, the network is the Internet. Vendor 205 or client 201 interacts with a web-based interface to submit the transaction file and CMF data to the server. The transaction file with CMF data is transmitted to the server using encryption such as Rivest-Shamir-Adelmar (RSA), Pretty Good Privacy (PGP), Data Encryption Standard (DES) or similar encryption tools. The submission of data to system 200 may be in a single batch file or multiple files. Each batch file may include multiple transaction or CMF files. In another embodiment, batch files may include transaction files, CMF files, tax data, direct deposit data, fee collection data, agency check data or other data as may be required by an originator as part of a transaction file or separate from the transaction file.

Figure 3:
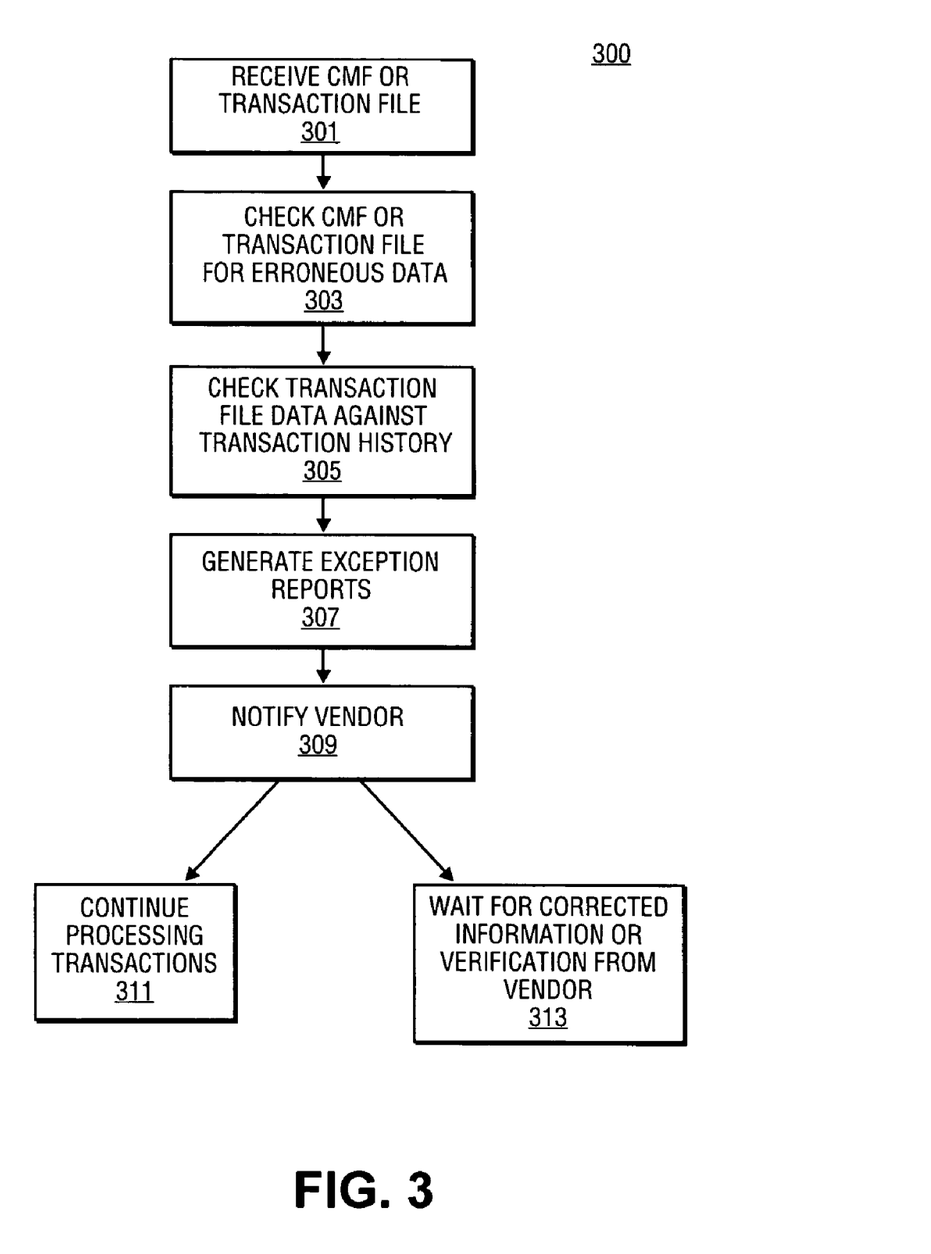
FIG. 3 is a diagram of a verification subsystem.

When the transaction file with CMF data from a vendor is received it can be processed by the scheduling/receiving/ balancing (SRB) system. Processing occurs on a server running automation system 200. FIG. 3 is a flowchart of the SRB system 207. SRB system 207 receives a transaction file with CMF data from a vendor (block 301). SRB system 207 then processes the transaction file with CMF data to check for errors in the data (block 303). The errors checked for in the transaction file include duplicate transaction data, adjusted transaction data, internal contradictions in the data such as year to date values that are not equal to the cumulative individual transactions, improperly balanced financial data corrupted data, unexpected receipts, client files expected but not received, clients received but not expected, and similar discrepancies that can be determined by use of the data in the transaction file. Similar checks of CMF data may be carried out to verify the coherency of data related to the client's organization (e.g, medical plan, cafeteria plan and similar organizational level information.)

Data in the transaction files is then verified against the transaction history of the individual clients and vendors (block 305). Transaction history verification can include a check of prior balance data against data submitted in the transaction files including year to date (YTD) gross payroll balances, all relevant tax data, a check for clients of vendors added or missing from prior transaction file data, unusual transaction amounts and similar analysis of transaction file data.

In one embodiment, additional tracking data is collected including a time check to determine the timeliness of the submission of the transaction file in order to track late fees, statistical data regarding the numbers of transmission files submitted, dollar amounts utilized and similar data. This data may be used to generate reports and notify collections system 221 of services rendered.

After the error and verification processes complete in SRB system 207, exception reports are generated. The exception reports include a listing of errors detected and possible discrepancies found in the transaction file with CMF data (block 307). The exception report may be displayed via a web browser or network application, electronically transferred over a network, facsimile or similar process, printed or delivered by similar manner to inform the vendor 205 and/or client 201, 203 of the potential problems with the transactions in the transaction file with CMF data (block 309).

A set of the transactions contained in the transaction file may be processed without further correction (block 311). The exception report can be used as a means for subsequent correction of actual errors by submitting further transactions or internal correction by a vendor 205 or client 201, 203 of their transaction and accounting data. In one embodiment, a set of the transactions submitted in the transaction file will not be further processed when a potential error is found until confirmation or correction of the data is obtained from the vendor 205 or client 201, 203 (block 313). In another embodiment, the type of transactions that require verification can be specified by a client 201, 203 or vendor 205 such that only the designated types of transactions require verification if potential errors related to them are found. Data verification of SRB system 207 may be executed by a server or similar system maintained by a service provider. Notification of errors may be generated and sent electronically.

Figure 4:
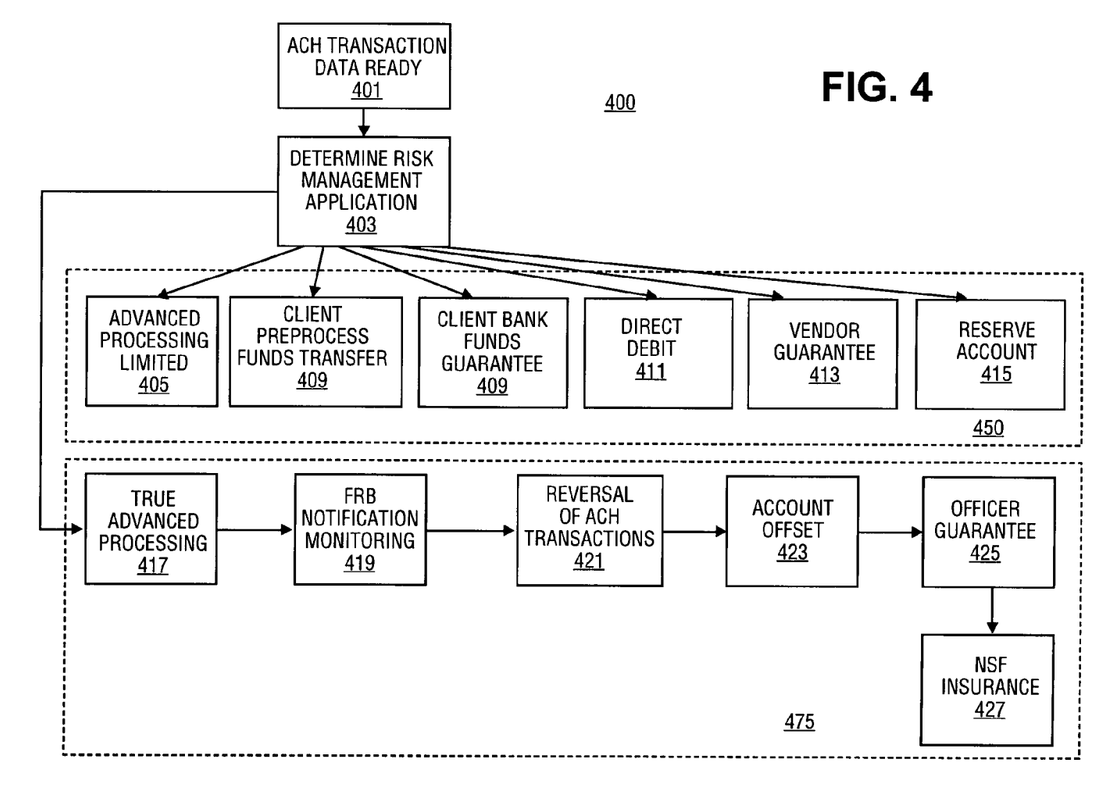
FIG. 4 is a diagram of a risk management system.

FIG. 4 is a diagram of the risk management system 400. In one embodiment, after the incoming transaction file has been processed by the SRB system 207, the ACH transaction set associated with the transaction file is prepared for final processing (block 401). Before final processing of the ACH transactions, the client 201, 203 and vendor 205 information associated with the ACH transactions is analyzed to determine the risk management system that is to be utilized (block 403). The risk management system 400 applied to the ACH transaction may be selected by system 200 or ODFI 105 based upon a client or vendor history. In one embodiment, the timing of the ACH transactions influences how the risk management system is applied. In one embodiment, the risk management system 400 is applied on a client by client basis. In another embodiment, the risk management system is applied on a vendor by vendor basis. Risk management schemes may be elected by a client 201, 203 or vendor 205 through a web based interactive account preferences management systems dedicated application or similar interface, at the time of initial enrollment in the automated system 200 service or subsequent thereto.

The risk management schemes provide the client 201, 203 and vendor 205 a set of bonding services to limit vendor 205 liability in processing the client 201, 203 transactions in the form of the risk management options discussed herein below.

A first risk management option involves limited advanced processing of the transactions (block 405). These transactions must be received in a transaction file at least 48 hours before the required settlement date of the transactions. For example, the federal reserve bank (FRB) settlement date or a client's payroll check disbursement date. If a client 201, 203 or vendor 205 elects this system of risk management, but does not provide the formatted transaction file data by the advanced date, the client 201, 203 must then transfer (i.e., by wire or similar mechanism) funds needed to settle a transaction at least the day before the settlement date in order to ensure the proper processing of the transaction.

In a second option, the client 201, 203 pre-authorizes a fixed funds transfer (block 407). The fixed funds transfer may be from client's bank account or similar account. The fixed funds transfer may occur approximately 48 hours prior to a settlement date. The fixed amount to be transferred can be based on the average of the client's payroll liabilities based on the client's transaction history. The prior history of transactions over the prior ninety days is used to determine the fixed funds transfer amount. An additional amount, for example 10 percent may be included to cover variations from the average. This additional amount can be determined based on the range of deviation in past transactions or similar data. Fixed fund transfer amounts are determined based on a detected pattern of prior transactions or a selected pattern of transactions. For example, clients having bi-weekly or weekly payroll liabilities with different liability levels for alternating settlement dates have an adjusted fixed fund transfer amount based on the alternative pattern.

In a third risk management option, client 201, 203 has a funds availability guarantee supplied by its bank (block 409). Client 201, 203 obtains an authorization from its bank for ACH transactions generated by the system 200 that guarantees sufficient funds availability. If client 201, 203 does not have sufficient funds at the time of an ACH transaction, the bank assumes liability of funding the ACH transactions that have been scheduled for that client 201, 203.

In a fourth risk management option, client 201, 203 establishes with its bank authorization for direct debit for ACH transactions (block 411). When system 200 processes ACH transactions from the transaction file all funds needed for payments are directly debited out of each client's account at client's bank.

In a fifth risk management option, a vendor guarantees funds availability for a specific client or set of clients (block 413). The client has an authorization from vendor 205, which guarantees liability by vendor 205 to ensure funds availability for all ACH transactions.

In a sixth risk management option, client 201, 203 maintains a "reserve" account with the provider of system 200 (block 415). The provider manages the reserve account to maintain funds in an amount approximately equal to the average monthly funds processed over a designated period of time, on a per cycle basis. The designated period of time is ninety days. In one embodiment, the reserve account has a minimum balance equal to the largest single ACH transaction amount processed by the system 200 for client 201, 203 in a defined time period. This defined time period may be a year previous to a given date. Client 201, 203 may establish the account over a period of time or at a single time.

A different system of risk management is used for transactions executed well in advance (e.g., more than two days) of the settlement date (block 475) from the immediate transactions (block 450). Clients 201, 203 that submit transaction data files more than two days in advance of a settlement date can be processed as received (block 417). Risk is minimized by post ACH transaction actions. The FRB return notification system may be closely monitored for each ACH transaction as well as similar return notification systems (block 419). Returned transactions may be immediately reported to the vendor 205 or client 201, 203 in order to correct the transactions prior to the settlement date.

Failed or flawed transactions may be reversed (block 421). If the FRB notifies system 200 of any returned transaction, the transaction may be reversed. Reversals can be applied to transactions involving, employee direct deposits, employee payment card deposits, tax payments and any other transactions that may affect a recipient (e.g., an employee or client associated entity). Reversals are retroactive to the time when the amount to be collected represents the total amount required to keep a trust account whole. The clients 201, 203 form agreements with their recipients (e.g., employees) to allow reversals.

In one embodiment, returned transactions are offset using funds held in trust, or similar accounts held by a client 201, 203, entities related to the client (e.g., client's bank, officers of client or similar entities), or a vendor 205 (block 423). These funds are used to offset funds used from a system 200 trust.

Officers, directors or similar entities related to a client or vendor may directly guarantee funds by agreeing to personal liability (block 425). If the client fails to reimburse a returned transaction, the personal guarantors of the client will be required to take necessary action to collect or assume these liabilities. In one embodiment, the guarantors make agreements to take personal liability at the time that service is established for a client. These guarantees may be by means of legal contract or similar arrangement.

The clients 201, 203 and vendors 205, or system 200 provider may opt for an NSF insurance program (block 427). Should an NSF item become uncollectable or should a bank approve an ACH transfer and then renege and refuse to accept liability the NSF insurance will cover the transaction.

Details of each risk management scheme are stored for each client 201, 203 and vendor 205 by system 205. This data is used to generate notices sent electronically or to generate reports to be sent to a client 201, 203 or vendor 205. This data is also shared with the collections 221 and funds management systems 225. Risk management system 201 may be executed by a server or similar system maintained by a service provider.

ACH transactions submitted in the transaction files may relate to payroll payments. In one embodiment, payroll taxes associated with these transactions are processed by tax system 211. The payroll tax system 211 allows a client 201, 203 or vendor 205 to provide the payroll tax data based on their own in house software, third party software, customized third party software and combinations thereof. If the client uses third party or in house payroll tax software, the format of the data will have to be formatted into a CMF or transaction file format. In one embodiment, system 200 includes a network based or stand alone conversion software to format third party or in house software generated data into a CMF or transaction file format.

Client 201, 203 or vendor 205 may also use the integrated payroll tax processing software of system 211. This software generates payroll tax data in a defined transaction file format. Vendor 205 or client 201, 203 may contract separately to use system 211 payroll tax software as a stand alone application or a network based application. In one embodiment, the network based application uses the Internet. A vendor 205 or client 201, 203 interfaces to the Internet based application and uploads payroll and similar data to the payroll tax application. The Internet payroll tax software may be owned by system 200 provider and the vendor 205 or client 201, 203 contracts for use of the payroll software. The Internet based tax application may be maintained by system 200 provider. The tax application may be updated for changes to tax regulations, or correction of the application. Updates may be made via a network, or via the Internet. Other data related to the system 200 may be submitted with payroll tax data to the tax system 211 via an Internet based application and/or stored by the tax application. System 200 can access the stored data of tax system 211 to carry out transactions including posting to vendor 205 or clients 201, 203 trust accounts, transaction processing, and similar processing that may use data stored by the tax system 211.

In one embodiment, the payroll tax application of tax system 211 is a remote system leased or owned by the vendor 205 or client 201, 203. This payroll tax application will have versions capable of being executed on various operating systems (e.g., Microsoft® Windows, Apple® OS 9.x, Unix based systems and similar operating systems) and hardware platforms. The remote application stores payroll tax data and other relevant data. System 200 may access this stored data for posting to a trust account, processing transactions or similar activities. System 200 may access this data over a secured network connection or similar manner of interconnectivity.

Tax system 211 prepares tax data related to a payroll of a client 201, 203 or vendor 205 for the filing of appropriate tax deposits and returns dependent on tax regulations for the jurisdiction of the client 201, 203 or vendor 205. Tax system 211 may be run on the server of system 200 or may be run on a separate server. System 200 in connection with the payroll tax system 211 can process accounts payable items as needed by the vendor 205 or client 201, 203 in addition to the tax payroll processing. Tax payroll processing software of system 211 is a double entry system and standard accounting practices are used to ensure that the system 200 maintains correct balances for all clients 201, 203 and vendors 205. Client 201, 203 or vendor 205 may view account status and information regarding tax data through a web based interface or a specialized application that can connect with system 200.

Payroll tax application system 211 includes a quarter end calculation system. The quarter end system uses double entry. The client 201, 203 or vendor 205 transmits the accumulated and calculated quarterly payroll data in a separate and discrete file to system 200 and payroll tax system 211. In one embodiment, the submitted data is in a standardized format. In one embodiment, payroll tax system 211 checks the submitted data against data previously stored by tax system 211 to determine the accuracy of newly stored information, by testing the submitted data for YTD gross, continuation reports, clients due to be received and similar data. Vendors 205 or clients 201, 203 will receive reports generated by the system 211 of discrepancies via a web based interface, SMTP messages, printed messages or similar notification. Vendor 205 or client 201, 203 may use such notification to correct internal data or notify system 200 of inaccurate data.

Quarter end submitted files are stored in quarter end ledgers. This information is combined with prior quarter data and amended return data stored by tax system 211 or system 200. This data is balanced by payroll tax system 211 per client's federal employer identification number. All taxes due are then paid by payroll tax system 211 by automatic deposit, i.e., ACH transaction, by generating a check or by similar payment methods. The appropriate tax returns are also filed by tax system 211. Any variance between quarter to date data and current ledger data is posted to client's ledger and a quarter end reconciliation package report is generated and forwarded to the client. Annual returns, if required, will also be filed by the tax system 211. Vendor 205 or client 201, 203 action may be required if discrepancies are found to authorize further processing or verify data.

Tax system 211 supports bulk filing 219 of payroll taxes. Instead of processing individual deposits, bulk filing 219 allows for the depositing of multiple clients' payroll taxes with federal, state, and local tax authorities on a bulk basis. Many vendors, due to taxing authority volume restrictions, may not qualify for bulk filing programs made available by the taxing authorities. Tax system 211 provides vendors 205 and client 201, 203 with the option of bulk filing 219. The vendor 205 or client 201, 203 may select which tax authorities it desires to bulk file 219 with, such as the Internal Revenue Service or state tax authorities, for each state that a client must file in, and city or other local tax authorities if applicable. Vendors 205 and clients 201, 203 may determine tax system and bulk filing preferences through a web-based interface or similar interface.

After system 200 completes risk management analysis, then all payroll tax transactions, ACH only transactions 213 and non-tax payroll transaction data 215 are processed by the customized ACH processing system 217. Data input into system 200 other than that typically needed for a payroll system may be provided in a single batch, as opposed to multiple batches. In one embodiment, a client may provide only that data which is typically provided per industry ACH standards.

Customized processing 217 moves all funds required to be processed as scheduled. Upon receipt of verified CMF and transaction file data the movement of funds is initiated through the ACH banking system. However, certain clients may be placed on a warehousing status. The funds to be transferred (i.e., the debit to the client) will then be held for a day or two and processed at the time requested by the client or an agent of the client. Credit transactions can be warehoused and may be distributed based upon the date established by the vendor 205, the client 201, 203 or by government regulation. Credit transactions may additionally be received from other agencies or companies. The warehouse will reject those items not scheduled to be received for processing. This may require vendor 205 or client 201, 203 action to approve further action or correct transaction data. Customized ACH transaction processing software 217 may run on a single server or be distributed over multiple servers. Customized processing system 217 may communicate with ACH banking serving via a network, dial-up connection, or similar communication method.

Banks used by a vendor, client, or beneficiary must have a capability of receiving and properly posting an ACH item generated by system 200. Vendor 205 or client 201, 203 may have trust accounts in a bank account authorized and maintained by system 200 provider.

Figure 5:
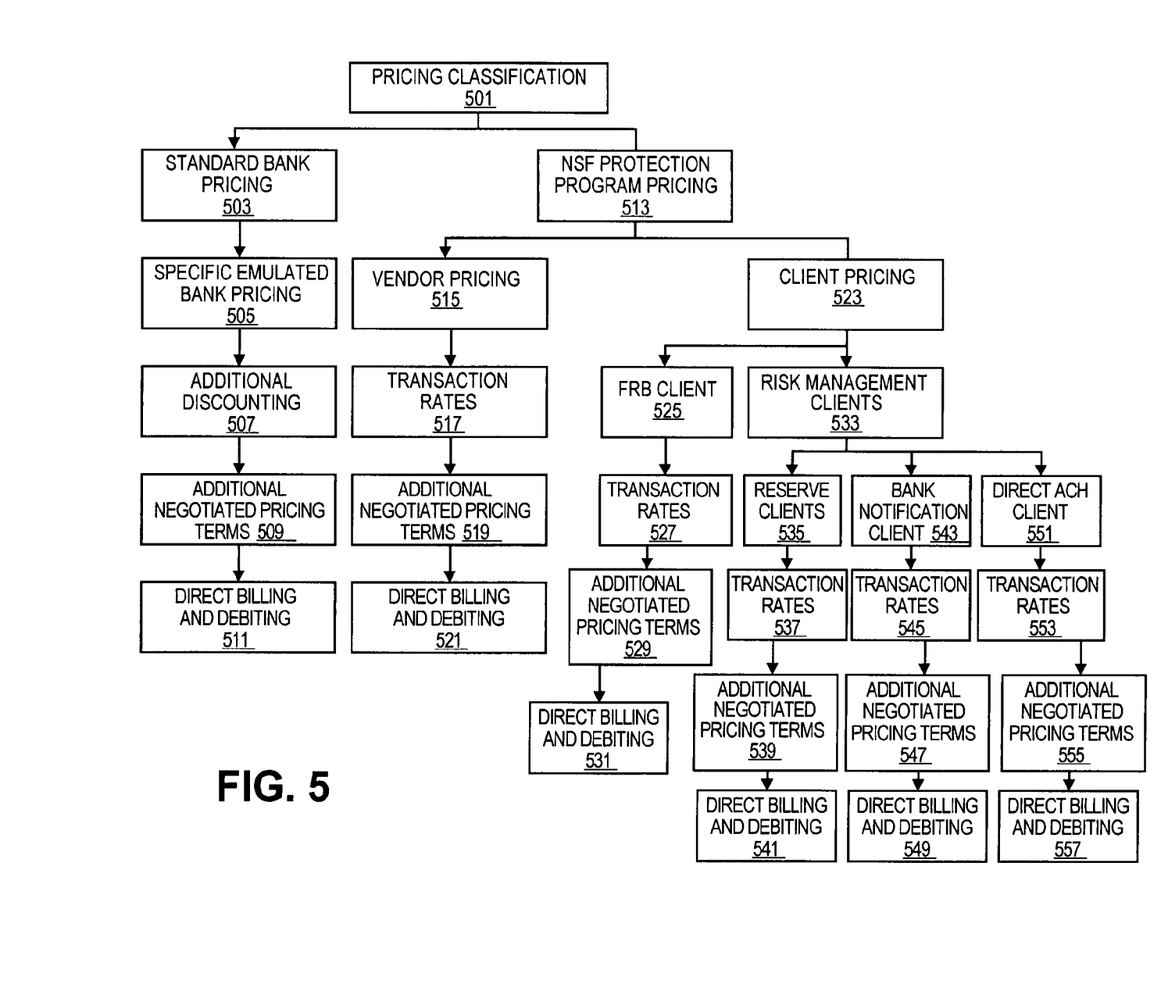
FIG. 5 is a diagram of a pricing classification system.

FIG. 5 is a diagram of a pricing classification system (block 501). This system is used to categorize each client 201, 203 and vendor 205. In order to determine the proper classification for a client 201, 203 or vendor 205, it is determined if an NSF protection plan is applicable. If an NSF plan is not applicable, then a standard pricing classification is used (block 503). The standard pricing classification is based on general practices of banking institutions. Rates and fees are determined based on industry standards. The standard pricing classification can be further modified to emulate the transaction rates and practice of a specific institution (block 505). Specific discounts programs may also be used to modify the standard pricing classification (block 505). Additional pricing terms and rates to modify the standard pricing classification may be negotiated with service provider (block 509). The standard pricing classification and modified forms of the classification allow for direct billing and ACH debiting from a client 201, 203 or vendor 205 account (block 511).

NSF plans may be an alternative to the standard pricing classification (block 513). NSF plans may be divided between vendor 205 and client 201, 203 classifications. Vendor billing (block 515) may include standard fees including fees based on clients per month, minimum charges, file correction charges and similar fees (block 517). Modification of the standard NSF vendor pricing may be negotiated with the service provider (block 519). Standard NSF vendor pricing allows for direct billing and ACH debiting from a vendor account.

Client billing classifications (block 523) are divided between federal reserve bank (FRB) clients (block 325) and risk management clients (block 533). FRB clients are charged a set of transactions and service fees based on files per cycle, number of transactions, minimum per file charges and similar fees (block 527). The FRB client pricing classification may be further modified based on negotiations with a service provider (block 529). The FRB client pricing classification allows for direct client billing and ACH debiting of a client's account (block 531).

Risk management clients are further subdivided into reserve clients (block 535), bank notification clients (block 543) and direct ACH clients (block 551). Reserve clients maintain cash reserves as defined by a service provider. Reserve clients may also have a guarantee from their bank, vendor 250 or third parties. Risk management clients have an applicable transaction rate schedule similar to FRB clients (block 537). Additional terms or modifications may be negotiated with the service provider (block 539). Reserve client classification allows for direct client billing and ACH debiting of a client's account (block 541).

Bank notification and direct ACH clients (blocks 543, 551) also have applicable transaction rate schedules. These rates may be greater, including three times greater than reserve or FRB clients due to increased risk for the service provider (blocks 545, 553). Additional terms or modification of these classifications may be negotiated with the service provider (blocks 547, 555). These classifications allow for direct client billing and ACH debiting of a client's account (blocks 549, 557).

Figure 6:
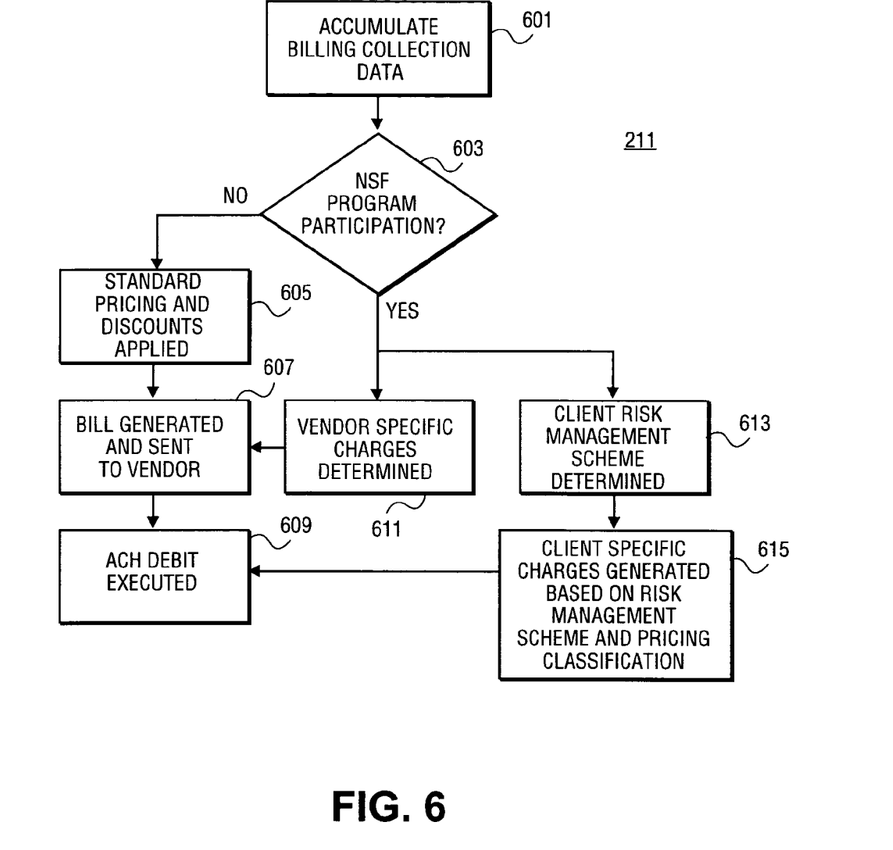
FIG. 6 is a flow chart of a collections processing system.

FIG. 6 is a flow chart of a collections system 221. Settings of collections system 221 may be accessed and altered by the vendor 205 or service provider through a web based interface application or similar interface. Collections system 221 accumulates billing data from incoming batch transaction file data and is provided data from SRB system 207, ACH processing system 217, tax system 211 and similar data sources (block 601). This data is used to determine the pricing classification for each client 201, 203 and vendor 25, as shown in FIG. 5. Collections system 221 determines if each client or vendor participates in an NSF program (block 503). If the clients 201, 203 and vendor 205 do not participate then a standard pricing and discounting scheme is applied to the transactions performed for the client 201, 203 or vendor 205 according to the pricing classification (block 605). A bill is then generated and sent to the vendor 205 via a web interface, electronic messaging or by mailing of a printed document (block 607). In one embodiment, the total owed by the vendor 205 or client 201, 203 is automatically directly debited by ACH transaction (block 609). All transactions including ACH transaction tax payments and billing for a desired period may be combined in a single ACH debit transaction for each client 201, 203 and vendor 205.

If a client 201, 203 or vendor 205 does participate in an NSF protection program then vendor specific charges may be determined separately according to the pricing classification for the vendor 250 (block 611). A bill (block 607) and direct debit (block 609) are then generated by collections system 221. The risk management scheme for each client is determined, if applicable, depending on the pricing classification of each client (block 613). Client specific billing is generated according to the applicable risk management scheme and pricing classification (block 615). The total owed by the client 201, 203 is automatically debited by ACH transaction (block 609). All transactions including the payments, ACH transactions and billing for a desired period may be combined in a single ACH transaction for each client 201, 203. Debit transactions having the same settlement date and bank account may be combined.

In one embodiment, system 200 includes a trust management accounting system 225. Trust management system 225 may run on a server with system 200 or on a separate server in communication via network or dial-up connection with system 200 server. Clients 201, 203 or vendors 205 may maintain transactional balances with trust management system 225. In another embodiment, clients 201, 203 or vendors 205 may maintain an accounting structure for their trust balances. The trust management system 225 functions as a demand deposit accounting system (DDA) that maintains deposit and disbursement activity for each client, vendor or other entity that has processed transaction activity through trust system 225 and requires balance forward accounting services. In one embodiment, trust management system 225 is a double entry accounting system.

Transaction data regarding the management of trusts is provided by the ACH transaction processing systems 217. Trust management system 225 maintains a complete and accurate ledger balance and activity on behalf of each client 201, 203 and vendor 205. Trust management system 225 generates periodic reports to clients 201, 203 and vendors 205 regarding the clients' overall activity within the trust account established for each client 201, 203 and vendor 205. Reports may be accessed via a web-based interface or printed and sent to clients 201, 203 and vendor 205. Trust management system 225 provides each client and vendor monthly or quarterly statements, as established for each when installed. Vendor 205 or client 201, 203 may manage or maintain their trust account through a web-based interface, software application or similar application via a network such as the Internet or dial-up connection.

Trust management services 225 mirror control account processing, or money market accounts. Trust management services 225 functions similar to a bank checking account with limitations, which may vary. In one embodiment a limitation may be placed on the payee, namely that all checks or transfers of funds may be made to only taxing authorities or other pre-approved payees.

Each trust account is held in the name of the system 200 provider. A sub-account may be in the name of the vendor 205 or client 201, 203. Deposits to the account will typically be made through ACH transactions. Disbursements will also typically be made through ACH transactions. The trust account may be balanced by the individual client 201, 203, vendor 205 or other entity as may be necessitated.

System 200 includes an investment accounting and forecasting system 229. The trust account balances, as well as other related data, are forwarded by system 200 to the trust fund investment subsystem 229. Investment and forecasting system 229 may run on system 200 server or a separate server in communication with the system 200 server. The investment system 229 maintains a history of each client's trust balance, including tracking of payroll, payroll tax and similar fund accounting. The forecasting and projecting of available funds for investing purposes, other than the typical day to day "bank" account investment includes the history of balances which is based upon current client 201, 203 or vendor 205 payroll system and current schedules of potential incoming and outgoing funds which are based on an expected client growth factor supplied by the vendor 205. At the option of the vendor 205, the forecasting module shall provide historical data reporting which measures month to month and quarter to quarter balances on a "this year" versus "last year" basis. The module also produces balances solely on a current month versus last month basis or other reporting data as may be required.

Vendor 205 or client 201, 203 are offered various investment options through investment system 229. These investment options will range from the percentage of investable funds in major investment categories to the allocation of different types of investments: extremely secure, very secure, secure; daily, weekly, monthly, quarterly, annually; amounts not to exceed certain ranges or maximums; and a base minimum that will never be invested, but will be maintained as liquid. This liquidity factor will always be maintained as a fall back amount for the sole purpose of having funds available for any emergency. The vendor 205 or client 201, 203 will additionally have control over where the investment is made, in what entity or type of security the available funds are invested. In one embodiment, vendor 205 or client 201, 203 can select investment options and manage balance through a web-based interface, specialized software application or similar application via a network such as the Internet or via dial-up connection.

The vendor selects the "outline" for the authorized investment and the subsystem 229 makes the required and designated investments in the percentages and time frames, as previously approved. The investments are based upon the best available option for the period in time that the funds are available or are forecasted as available. These funds may be invested with and through leading financial firms.

System 200 supports a payment card system 227. A separate software module processes more detailed payroll data. One of the processing tasks of this module is the handling of the paycard subsystem 227. A vendor 205 provides the pay card system 227 with the specific payroll data required to process this application. The payroll data is based upon data made available to the vendor 205 by the client 201, 203 or client's employee.

The paycard system 227 automatically posts the earnings of a client's employee to a system 200 account established in the employee's name. This may be the net amount of the employee's paycheck or it may be an amount deducted from the employee's gross and designated to be forwarded to the employee's payment card account. The employee will be issued a payment card and may use it at their discretion to pay for items against their account as long as the employee has sufficient funds available. The employee's funds are held in a trust account and maintained individually by the paycard system 227. The employee will receive standard or similar reports that are available in the marketplace.

Other deposits and disbursements 223 that the system 200 processes include: IRA deposits, 401(k) program deposits, 125 California plan, Cafeteria plan deposits, worker's compensation payments or programs, group health benefit disbursements, and similar scheduled payroll based calculated items that can be inventoried or warehoused for payment on a timely basis. These funds will also be accounted for in a trust system on behalf of the employee or client. In one embodiment, the trust fund accounts are transferred to the investment forecasting subsystem for investment. In one embodiment, these funds are managed entirely by, and for, the exclusive benefit of the system 200 provider. Such investments would be inline with industry standards.

Figure 7:
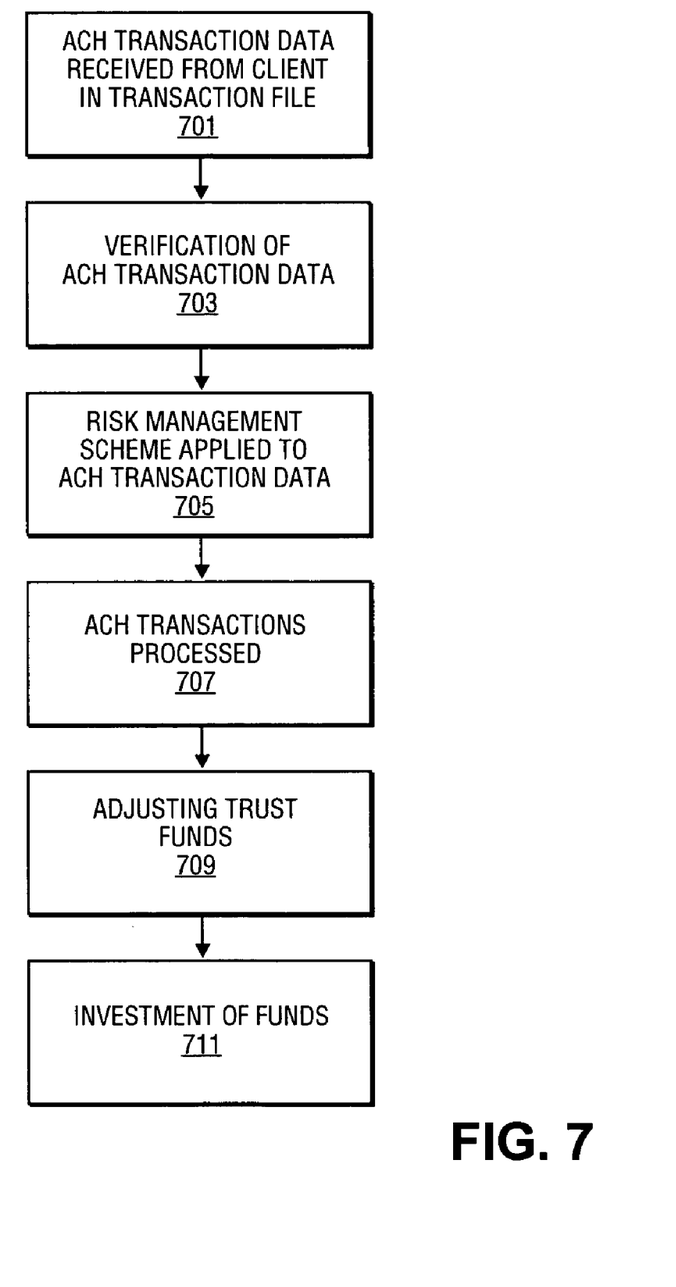
FIG. 7 is a flow chart of transaction processing in the automated system.

FIG. 7 is a flow chart showing the processing of a transaction file in automated system 200. Transaction data including ACH transactions are received by system 200 from a vendor 205 or client 201, 203 (block 701). The transaction file may be in a specified format. The transaction file may be received via a web interface, over a network, through a dial-up connection or through a similar system. After the data is received, it is checked and verified by the SRB system 207 (block 703). If verification or corrected data is required, then system 200 awaits client 201, 203 or vendor 205 input.

After SRB system 207 completes system 200 applies the appropriate risk management scheme in the risk management system 210 (block 705). After the requirements of the applicable risk management scheme have been met, then the ACH transactions are processed by system 200 (block 707).

In coordination with the appropriate risk management scheme and ACH transaction processing, client trust account balances are adjusted (block 709). Clients may also wire or provide additional funds to system 200 that are kept in trust. When trust fund balances meet threshold requirements, additional funds may be invested (block 711). This investment system 229 forecasts future available funds and invests surplus funds appropriately.

In another embodiment, subsystems and services including payroll tax system 211, trust management system 225, investment and forecasting system 229, bulk filing system 219, paycard system 227, bonding services, tax consulting, and collection system 221 may be used with standard ACH processing systems where multiple batch files for payroll transactions such as direct deposit, fee collection, agency checks, tax liability and similar transactions are submitted separately. The above mentioned systems and services may be used in any combination to process or manage the individual or combined batch files.

In view of the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer-implemented method executed by an automated system for providing automated clearing house (ACH) payroll vender services by a payroll services provider that limit financial risk to a payroll vendor, the method comprising:

receiving a plurality of transaction files from a payroll vendor for a plurality of clients, each of the plurality of transaction files including a set of automated clearing house (ACH) transactions and client master file (CMF) data defining payroll data for a given client, the plurality of transaction files received through a web-based interface of the automated system;

processing each transaction file by a scheduling/receiving/balancing (SRB) system in the automated system to check for errors and to verify against prior balance data;

generating an exception report identifying errors in the plurality of transaction files, the exception report provided to the payroll vendor through the web-based interface; and executing each ACH transaction in the transaction file by a risk management system of the automated system, such that an ACH transaction resulting in a non-sufficient fund (NSF) are initially a responsibility of the payroll service provider, where the payroll services provider manages NSF risk allotment for each ACH transaction by application of any one of a plurality of payroll vendor specific risk management schemes, the plurality of payroll vendor specific risk management schemes including limited advanced processing of the transactions, client preprocessed funds transfer, client bank funds guarantee, direct debit executions, vendor guarantee, reserve account usage, full advanced processing of the ACH transactions, federal reserve bank (FRB) notification monitoring, ACH transaction reversal, account offset, officer guarantee or NSF insurance.

* * * * *